United States Patent
Sundar et al.

(10) Patent No.: US 9,626,185 B2
(45) Date of Patent: Apr. 18, 2017

(54) IT INSTRUCTION PRE-DECODE

(71) Applicant: Apple Inc., Cupertino, CA (US)

(72) Inventors: Shyam Sundar, Sunnyvale, CA (US); Ian D. Kountanis, Santa Clara, CA (US); Conrado Blasco-Allue, Sunnyvale, CA (US); Gerard R. Williams, III, Los Altos, CA (US); Wei-Han Lien, San Jose, CA (US); Ramesh B. Gunna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 762 days.

(21) Appl. No.: 13/774,093

(22) Filed: Feb. 22, 2013

(65) Prior Publication Data

US 2014/0244976 A1    Aug. 28, 2014

(51) Int. Cl.
*G06F 15/00*    (2006.01)
*G06F 9/30*    (2006.01)
*G06F 9/40*    (2006.01)
*G06F 9/38*    (2006.01)

(52) U.S. Cl.
CPC ...... *G06F 9/30054* (2013.01); *G06F 9/30181* (2013.01); *G06F 9/382* (2013.01); *G06F 9/3842* (2013.01); *G06F 9/3844* (2013.01)

(58) Field of Classification Search
None
See application file for complete search history.

(56) References Cited

U.S. PATENT DOCUMENTS

| | | | |
|---|---|---|---|
| 6,009,512 A | 12/1999 | Christie | |
| 6,088,715 A * | 7/2000 | Oberman | G06F 7/483 708/505 |
| 6,192,465 B1 * | 2/2001 | Roberts | G06F 9/30152 712/212 |
| 7,178,011 B2 | 2/2007 | Seal et al. | |
| 2005/0050309 A1 | 3/2005 | Yamashita et al. | |
| 2006/0112262 A1 | 5/2006 | Elwood | |
| 2009/0249033 A1 * | 10/2009 | Greenhalgh | G06F 9/30149 712/205 |
| 2010/0017580 A1 * | 1/2010 | Greenhalgh | G06F 9/30145 712/205 |
| 2012/0204007 A1 * | 8/2012 | Reid | G06F 9/30069 712/208 |

* cited by examiner

*Primary Examiner* — George Giroux
(74) *Attorney, Agent, or Firm* — Rory D. Rankin; Meyertons, Hood, Kivlin, Kowert & Goetzel, P.C.

(57) ABSTRACT

Various techniques for processing and pre-decoding branches within an IT instruction block. Instructions are fetched and cached in an instruction cache, and pre-decode bits are generated to indicate the presence of an IT instruction and the likely boundaries of the IT instruction block. If an unconditional branch is detected within the likely boundaries of an IT instruction block, the unconditional branch is treated as if it were a conditional branch. The unconditional branch is sent to the branch direction predictor and the predictor generates a branch direction prediction for the unconditional branch.

20 Claims, 8 Drawing Sheets

Sample Program Code 140 →

```
ITETE EQ
LDR r0, [r1]
LDR r0, [r2]
ADD r0, r3, r0
B L1

⋮

L1
ADD r0, r4, r0

IT INSTRUCTION PRE-DECODE

BACKGROUND

Field of the Invention

The present invention relates generally to processors, and in particular to methods and mechanisms for processing instructions in an instruction pipeline.

Description of the Related Art

Modern day processor systems tend to be structured in multiple stages in a pipelined fashion. Typical pipelines often include separate units for fetching instructions, decoding instructions, mapping instructions, executing instructions, and then writing results to another unit, such as a register. An instruction fetch unit of a microprocessor is responsible for providing a constant stream of instructions to the next stage of the processor pipeline. Typically, fetch units utilize an instruction cache in order to keep the rest of the pipeline continuously supplied with instructions. The sequence of instructions being fetched is based upon a prediction of the program flow, which is normally sequential. However, branch instructions can change the sequential nature of program flow. Therefore, accurate prediction of branch instructions can ensure the fetch unit continues to fetch instructions down the correct path.

For some implementations of processor pipelines, the program instructions may include if-then (IT) instructions. An IT instruction is used to predicate a predetermined number of the following instructions. The IT instruction along with the instructions that follow the IT instruction and that are controlled by the IT instruction may be referred to herein as an "IT instruction block". The IT instruction specifies a condition and indicates for each of the following instructions in the IT instruction block whether the true or false result for the condition causes the instruction to be executed. If one of the instructions in the block is an unconditional branch, then the IT instruction effectively changes the unconditional branch into a conditional branch. However, in some processor pipelines, it may be difficult to determine early in the pipeline if an unconditional branch that follows closely behind an IT instruction is actually part of the IT instruction block. If the branch prediction mechanism of the processor waits to predict the branch direction of an unconditional branch until after the IT instruction block boundaries are resolved, this may result in a large performance penalty by staying too long on the wrong fetch path.

SUMMARY

Apparatuses, processors and methods for processing unconditional branches within an IT instruction block are disclosed. The front-end of a processor pipeline may include an instruction fetch unit, an instruction cache, a pre-decode unit, and a branch prediction mechanism. Instruction data may be fetched from lower levels of cache or memory and stored in the instruction cache. When cache lines of instruction data are fetched into the instruction cache, the cache lines may be pre-decoded by the pre-decode unit.

If the pre-decode unit detects an (if-then) IT instruction in the instruction cache, then the pre-decode unit may set a pre-decode bit to indicate the presence of the IT instruction. The IT instruction block boundaries may not be precisely known at this stage of the instruction pipeline, and so the pre-decode bits may be set on a coarse-grained level. The cache line may be logically partitioned into a plurality of portions, and there may be a pre-decode bit for each portion of the cache line. In one embodiment, the cache line may be logically partitioned into four portions, and a pre-decode bit per quarter cache line may be encoded by the pre-decode unit. In this embodiment, if an IT instruction is detected, a pre-decode bit may be set for the portion containing the IT instruction and for the following two portions.

When cache lines are read out of the instruction cache, the pre-decode bits may be read at the same time. If the pre-decode bit for a given cache line portion is set, indicating the proximity of an IT instruction, then this pre-decode bit may be applied to any unconditional branches located within this cache line portion. As a result, the unconditional branch will be treated as if it were a conditional branch. Therefore, if an unconditional branch falls in the shadow of an IT instruction, then the unconditional branch may be processed by the branch prediction mechanism to predict whether this unconditional branch will be taken or not.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 5 is one embodiment of sample program code.

DETAILED DESCRIPTION OF EMBODIMENTS

Figure 1:
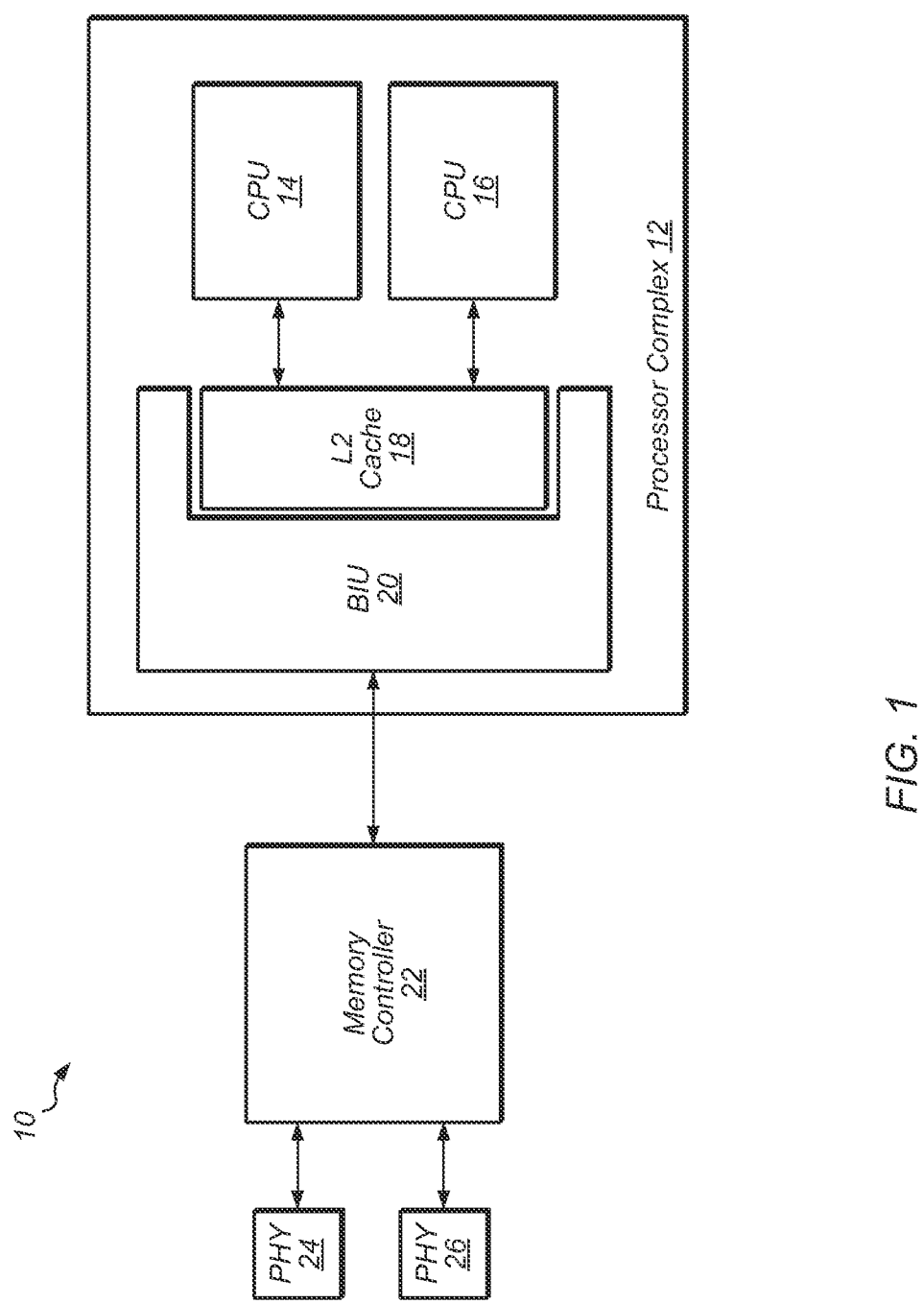
FIG. 1 illustrates one embodiment of a portion of an integrated circuit.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising an instruction cache . . . " Such a claim does not foreclose the apparatus from including additional components (e.g., a load store unit, an execution unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes a processor complex 12, memory controller 22, and memory physical interface circuits (PHYs) 24 and 26. It is noted that IC 10 may also include many other components not shown in FIG. 1. In various embodiments, IC 10 may also be referred to as a system on chip (SoC), an application specific integrated circuit (ASIC), or an apparatus.

Processor complex 12 may include central processing units (CPUs) 14 and 16, level two (L2) cache 18, and bus interface unit (BIU) 20. In other embodiments, processor complex 12 may include other numbers of CPUs. CPUs 14 and 16 may also be referred to as processors or cores. It is noted that processor complex 12 may include other components not shown in FIG. 1.

The CPUs 14 and 16 may include circuitry to execute instructions defined in an instruction set architecture (ISA). Specifically, one or more programs comprising the instructions may be executed by CPUs 14 and 16. Any ISA may be implemented in various embodiments. For example, in one embodiment, the ARM™ ISA may be implemented. The ARM instruction set may include 16-bit (Thumb or Thumb-2) and 32-bit instructions. Other ISAs may include the PowerPC™ instruction set, the MIPS™ instruction set, the SPARC™ instruction set, the x86 instruction set (also referred to as IA-32), the IA-64 instruction set, etc.

Each of CPUs 14 and 16 may also include a level one (L1) cache (not shown), and each L1 cache may be coupled to L2 cache 18. Other embodiments may include additional levels of cache (e.g., level three (L3) cache). In one embodiment, L2 cache 18 may be configured to cache instructions and data for low latency access by CPUs 14 and 16. The L2 cache 18 may comprise any capacity and configuration (e.g. direct mapped, set associative). L2 cache 18 may be coupled to memory controller 22 via BIU 20. BIU 20 may also include various other logic structures to couple CPUs 14 and 16 and L2 cache 18 to various other devices and blocks.

Memory controller 22 may include any number of memory ports and may include circuitry configured to interface to memory. For example, memory controller 22 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 22 may also be coupled to memory physical interface circuits (PHYs) 24 and 26. Memory PHYs 24 and 26 are representative of any number of memory PHYs which may be coupled to memory controller 22. Memory PHYs 24 and 26 may be configured to interface to memory devices (not shown).

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
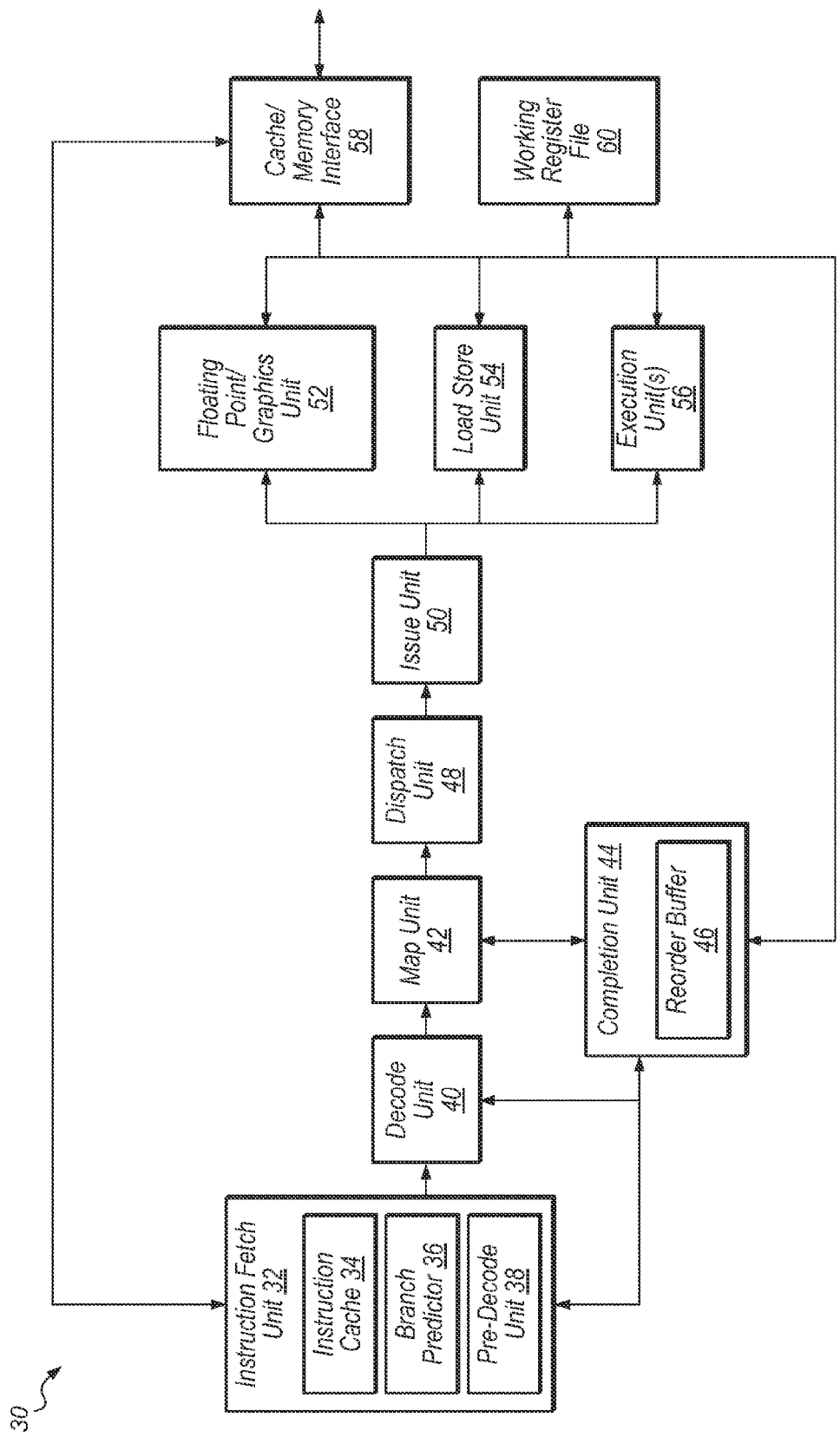
FIG. 2 is a block diagram that illustrates one embodiment of a processor core.

Turning now to FIG. 2, a block diagram illustrating one embodiment of a pipeline of processor 30 is shown. Processor 30 is one example of a processor core, and processor 30 may be utilized within a processor complex, such as processor complex 12 of FIG. 1. In one embodiment, each of CPUs 14 and 16 of FIG. 1 may include the components and functionality of processor 30. It is noted that processor 30 may include other components and interfaces not shown in FIG. 2

Processor 30 includes instruction fetch unit (IFU) 32 which includes an instruction cache 34, branch predictor 36, and pre-decode unit 38. IFU 32 may also include other components (e.g., ITLB) not shown in FIG. 2 to avoid cluttering the figure. IFU 32 is coupled to an instruction processing pipeline that begins with a decode unit 40 and proceeds in turn through a map unit 42, a dispatch unit 48, and issue unit 50. Issue unit 50 is coupled to issue instructions to any of a number of instruction execution resources including execution unit(s) 56, a load store unit (LSU) 54, and/or a floating-point/graphics unit (FGU) 52. These instruction execution resources are coupled to a working register file 60. Additionally, LSU 54 is coupled to cache/memory interface 58. Reorder buffer 46 is coupled to IFU 32, decode unit 40, working register file 60, and the outputs of any number of instruction execution resources. It is noted that the illustrated embodiment is merely one example of how processor 30 may be implemented. Alternative configurations and variations are possible and contemplated.

In one embodiment, IFU 32 may be configured to fetch instructions from instruction cache 34 and buffer them for downstream processing, request data from a cache or memory through cache/memory interface 58 in response to instruction cache misses, and predict the direction and target of control transfer instructions (e.g., branches). Pre-decode unit 38 may be configured to pre-decode lines fetched into instruction cache 34 to facilitate various timing optimization techniques. Pre-decode unit 38 may detect predication instructions (e.g., IT instructions), branches, and/or other types of instructions. The pre-decode information generated by pre-decode unit 38 may be used to allow unconditional branches within IT instructions to be treated as conditional branches by branch predictor 36. Branch predictor 36 may include multiple separate units for predicting branch directions and targets for encountered branch instructions. In some embodiments, IFU 32 may include a number of data structures in addition to those shown, such as an instruction translation lookaside buffer (ITLB), instruction buffers, and/or other structures configured to store state that is relevant to thread selection and processing (in multi-threaded embodiments of processor 30).

In one embodiment, branch predictor 36 may include a branch resolution block that takes as inputs the instruction data from instruction cache 34, a next fetch predictor prediction, a branch direction prediction, a branch target prediction (for indirect branches and return branches), and the output of a predictor for direct branch targets. The instruction data may get fed into a branch instruction decoder that figures out which instructions are actually branches and which branches are conditional. The branch direction prediction only applies to conditional branches. The branch resolution block may gather all of these inputs and determine if the next fetch predictor prediction was right or wrong (i.e., whether it agrees with the other predictors). If the prediction is wrong, instruction fetch unit 32 will be re-steered immediately to the correct path. For performance reasons, this determination about the correctness of the next fetch predictor prediction should be made as soon as possible. The longer it takes to re-steer instruction fetch unit 32, the larger the performance penalty is paid for staying longer on the wrong fetch path.

In some embodiments, one of the challenges encountered by the branch resolution block is determining if an unconditional branch instruction is inside an IT instruction block. In certain cases, it may take many clock cycles to figure out whether or not an instruction is inside an IT instruction block. For example, the number of dependent instructions within an IT instruction block is variable (from 1 to 4), and so it may take several clock cycles to determine the boundary of the IT instruction block. Also, in some ISAs, different instruction sizes (16-bit or 32-bit) may be used interchangeably, and so finding instruction boundaries may take several clock cycles. Rather than waiting multiple clock cycles to determine if an unconditional branch is inside an IT instruction block, pre-decode unit 38 may generate pre-decode data to resolve this uncertainty at an earlier stage. Pre-decode unit 38 may generate pre-decode bits to indicate that an unconditional instruction follows closely behind an IT instruction and therefore should be treated as a conditional instruction.

In one embodiment, decode unit 40 may be configured to prepare fetched instructions for further processing. Decode unit 40 may be configured to identify the particular nature of an instruction (e.g., as specified by its opcode) and to determine the source and destination registers encoded in an instruction, if any. Map unit 42 may be configured to map the decoded instructions (or uops) to physical registers within processor 30. Map unit 42 may also implement register renaming to map source register addresses from the uops to the source operand numbers identifying the renamed source registers. Dispatch unit 48 may be configured to dispatch uops to reservation stations (not shown) within the various execution units.

Issue unit 50 may be configured to provide instruction sources and data to the various execution units for picked (i.e., scheduled or dispatched) instructions. In one embodiment, issue unit 50 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, processor 30 includes a working register file 60 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 50 may proceed to one or more of the illustrated execution units to be performed. In one embodiment, each of execution unit(s) 56 is similarly or identically configured to perform certain integer-type instructions defined in the implemented ISA, such as arithmetic, logical, and shift instructions. In some embodiments, architectural and non-architectural register files are physically implemented within or near execution unit(s) 56. It is contemplated that in some embodiments, processor 30 may include any number of integer execution units, and the execution units may or may not be symmetric in functionality.

Load store unit 54 may be configured to process data memory references, such as integer and floating-point load and store instructions and other types of memory reference instructions. LSU 54 may include a data cache (not shown) as well as logic configured to detect data cache misses and to responsively request data from a cache or memory through cache/memory interface 58. In one embodiment, a data cache in LSU 54 may be configured as a set-associative, write-through cache in which all stores are written to a higher-level (e.g., L2) cache regardless of whether they hit in the data cache.

In various embodiments, LSU 54 may implement a variety of structures configured to facilitate memory operations. For example, LSU 54 may implement a data TLB to cache virtual data address translations, as well as load and store buffers configured to store issued but not-yet-committed load and store instructions for the purposes of coherency snooping and dependency checking LSU 54 may include a miss buffer configured to store outstanding loads and stores that cannot yet complete, for example due to cache misses. In one embodiment, LSU 54 may implement a store queue configured to store address and data information for stores that have committed, in order to facilitate load dependency checking. LSU 54 may also include hardware configured to support atomic load-store instructions, memory-related exception detection, and read and write access to special-purpose registers (e.g., control registers).

Floating-point/graphics unit (FGU) 52 may be configured to perform and provide results for certain floating-point and graphics-oriented instructions defined in the implemented ISA. For example, in one embodiment FGU 52 implements single- and double-precision floating-point arithmetic instructions compliant with the IEEE floating-point standards, such as add, subtract, multiply, divide, and certain transcendental functions.

In the illustrated embodiment, completion unit 44 includes reorder buffer (ROB) 46 and coordinates transfer of speculative results into the architectural state of processor 30. Entries in ROB 46 may be allocated in program order. Completion unit 44 may include other elements for handling completion/retirement of instructions and/or storing history including register values, etc.

In some embodiments, speculative results of instructions may be stored in ROB 46 before being committed to the architectural state of processor 30, and confirmed results may be committed in program order. Entries in ROB 46 may be marked as completed when their results are allowed to be written to the architectural state. Completion unit 44 may also be configured to coordinate instruction flushing and/or replaying of instructions.

Figure 3:
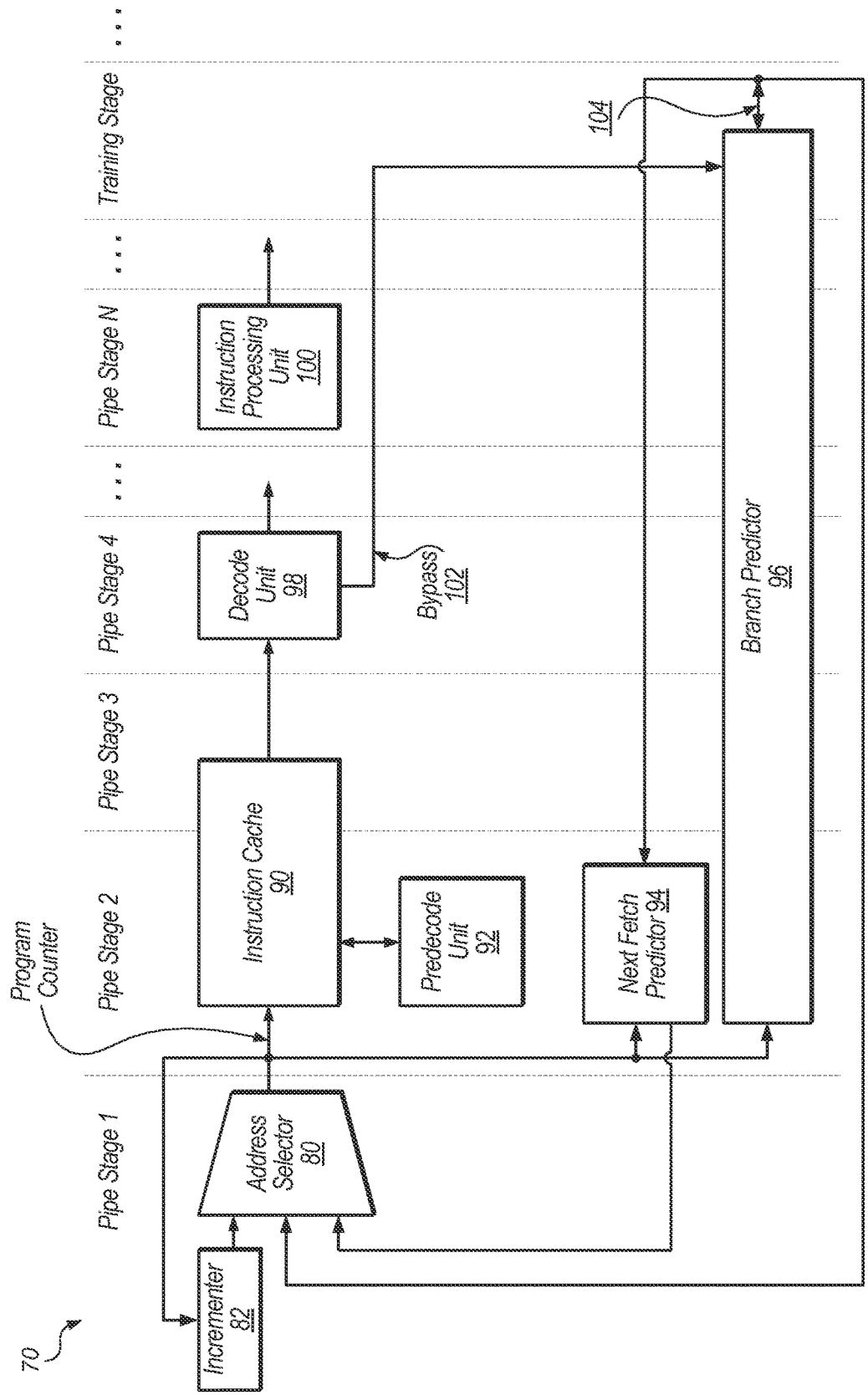
FIG. 3 is a block diagram illustrating one embodiment of a front end of a processor pipeline.

Referring to FIG. 3, a generalized block diagram illustrating one embodiment of a front-end pipeline 70 of a processor is shown. In the embodiment shown, pipeline 70 is a multi-stage pipeline for the processing of instructions. The concept of a processor "pipeline" is well understood, and refers to the concept of splitting the "work" a processor performs on instructions into multiple stages. In one embodiment, instruction decode, dispatch, execution, and retirement may be examples of different pipeline stages. Many different pipeline architectures are possible with varying orderings of elements. Various pipeline stages perform such steps on an instruction during one or more processor clock cycles, then pass the instruction and/or operations associated with the instruction on to other stages for further processing.

An instruction cache 90 may store instructions for a software application (a user application, operating system, etc.) executing on the processor. One or more instructions indicated by a program counter (PC) address conveyed by the address selector 80 are fetched (i.e., retrieved) from the instruction cache 90. Multiple instructions may be fetched from the instruction cache 90 per clock cycle if there are no instruction cache misses (i.e., the requested instructions are currently located in instruction cache 90).

In certain embodiments, the processor may implement an address translation scheme allowing one or more virtual address spaces to be made visible to executing software. Memory accesses within the virtual address space may be translated to a physical address space corresponding to the actual physical memory available to the processor. In embodiments of processor that employ address translation, instruction cache 90 may be partially or completely addressed using physical address bits rather than virtual address bits. For example, in one embodiment, instruction cache 90 may use virtual address bits for cache indexing and physical address bits for cache tags. In order to avoid the cost of performing a full memory translation when performing a cache access, the processor may store a set of recent and/or frequently used virtual-to-physical address translations in a translation lookaside buffer (TLB), which is not shown in FIG. 3.

In the embodiment shown, the current fetch address supplied to instruction cache 90 comes from address selector 80. In this particular implementation, selector 80 receives three different inputs (other numbers of inputs are possible depending on what sort of prediction logic is used). One input to selector 80 is supplied by incrementer 82, which supplies a next sequential PC address (i.e., the next PC assuming that there is not a taken branch). Other inputs are supplied to selector 80 by next fetch predictor 94 and branch predictor 96. As can be seen from the depiction of pipeline stages in FIG. 3, next fetch predictor 94 is configured to generate an address prediction prior to predictions generated by branch predictor 96.

In one embodiment, next fetch predictor 94 may generate a non-sequential PC address based on a prediction for a given branch or other control transfer instruction that is relatively faster than a corresponding prediction for the given branch instruction that is made by branch predictor 96. In some embodiments, next fetch predictor 94 accesses branch prediction information based on the PC address.

In one embodiment, branch predictor 96 may receive at least a portion of the PC address used to fetch instructions from the instruction cache 90. Using this and other information, branch predictor 96 may perform a prediction of the direction and target of a branch instruction that was predicted by next fetch predictor 94. The prediction of predictor 96 may, in many embodiments, be relatively slower (and thus more accurate) than the prediction generated by predictor 94. For instance, branch predictor 96 may combine, in a separate hash function, at least a portion of the received PC address with another portion of itself or with other values, such as history information. Various hashing functions may be performed to determine an index to one or more pattern history tables (PHTs), branch target buffers (BTBs), and/or other tables used to provide branch prediction data 104. The branch prediction data 104 may include a branch direction and a branch target address. The branch predictor 96 may utilize multiple clock cycles to both determine the outcome of the condition of a branch instruction and to determine the branch target address.

The branch predictor 96 may thus provide branch prediction data 104 with higher prediction accuracy than the next fetch predictor 94. For performance reasons, however, it may be desirable to obtain a faster prediction. Therefore, the next fetch predictor 94 may be used to provide a quick, initial branch prediction. In the illustrated embodiment, next fetch predictor 94 provides a predicted next address to instruction cache 90 through address selector 80. In other embodiments, next fetch predictor 94 may provide predicted fetch address to instruction cache 90 through other communication paths. The branch predictor 96 may perform a parallel, slower branch prediction, which may or may not confirm the prediction generated by next fetch predictor 94.

The prediction data generated by the next fetch predictor 94 may be stored and staged along the pipeline for processor so as to be made available to various pipeline stages. The staged prediction data may be compared to prediction data generated at a later pipeline stage by the branch predictor 96 or completion data generated from execution and completion of branch instructions. When the next fetch predictor 94 generates branch prediction data that does not match prediction data 104 generated by the branch predictor 96 at a later time, the next fetch predictor 94 may be updated or trained with the prediction data 104 generated by the branch predictor 96 (e.g., during the training stage of FIG. 3). Next fetch predictor 94 may be similarly trained at retirement or completion of relevant instructions. As used herein, training the next fetch predictor 94 may include writing or updating stored parameters in the next fetch predictor 94 based on branch prediction data 104 generated by the branch predictor 96. Note that the training stage may precede pipeline stage N in some embodiments. It is also noted that the ordering of pipeline stages in FIG. 3 is intended to be representative of one embodiment and not to exclude other implementations.

Decode unit 98 may, in one embodiment, decode the opcodes of the multiple fetched instructions. Decode unit 98 may send the instructions with additional decoded information to other components in the processor for instruction processing in later pipeline stages. These later pipeline stages are generically represented by instruction processing unit 100. For example, the decode unit 98 may allocate entries in a dispatch queue. Register renaming, instruction scheduling, executing arithmetic operations and/or performing memory accesses, and in-order retiring are just some examples of later instruction processing steps. In one embodiment, decode unit 98 may forward data to a later pipeline stage while bypassing other pipeline stages. For example, in order to train next fetch predictor 94, decode unit 98 may decode branch instructions and forward decoded instruction information to next fetch predictor 94 and/or branch predictor 96 for use during a training stage of the pipeline. Such a configuration is shown in FIG. 3 as bypass 102.

Pre-decode unit 92 may be configured to scan the cache lines stored in instruction cache 90 for predication instructions. Alternatively, pre-decode unit 92 may be configured to scan cache lines for predication instructions as the cache lines are fetched and stored in instruction cache 90. One type of predication instruction is an if-then (IT) instruction. The if-then (IT) instruction is an instruction defined in the ARM Thumb-2 architecture to predicate up to four following instructions. The IT instruction includes a condition and a pattern string of up to three letters to indicate if the following instructions should be in the "then" path (if the condition is true) or in the "else" path (if the condition is false). The first instruction following the IT instruction is in the "then" path and is executed if the condition is true. The execution status of the other instructions is indicated by the IT instruction's pattern string. For example, if the IT instruction pattern string is "TET", then the second and fourth instructions in the block fall in the "then" path and the third instruction falls in the "else" path.

If the pre-decode unit 92 detects a predication instruction in the instruction data stored in instruction cache 90, then pre-decode unit 92 may generate pre-decode bits at a coarse-grained level to indicate the likely boundaries of the predication instruction. Pre-decode unit 92 may detect a predication instruction prior to the boundary of the predication instruction being identified. Pre-decode unit 92 may mark the portion of the cache line where the predication instruction is located and mark the following portions that are within a predetermined distance from the predication instruction. The predetermined distance may be equal to the amount of space that would include any possible dependent instructions of the predication instruction assuming the size of the dependent instructions is the largest possible size for the specific ISA of the processor. It is noted that in some embodiments, 16-bit and 32-bit instructions may be intermixed in the program code. In these embodiments, the predetermined distance may be equal to the size of four 32-bit instructions, or 128 bits (16 bytes). Other embodiments may have other sizes of instructions and other numbers of instructions within a predicating instruction.

In one embodiment, the pre-decode information generated by pre-decode unit 92 may be stored with the instruction data in instruction cache 90. When instructions are fetched out of the instruction cache 90, the corresponding pre-decode information may also be fetched out of instruction cache 90. The instructions and corresponding pre-decode information may be conveyed to decode unit 98. Decode unit 98 may determine how to process subsequent branch instructions based on the pre-decode information. For example, if an unconditional branch instruction is located within the predetermined distance of a predication instruction, then decode unit 98 may treat the unconditional branch instruction as if it were a conditional branch instruction. Decode unit 98 may forward the decoded branch instruction information to next fetch predictor 94 and branch predictor 96, which may process the unconditional branch instruction as though it were a conditional branch instruction. For example, branch predictor 96 may generate a branch direction prediction for the unconditional branch instruction, and the branch direction prediction may actually be based on the condition of the preceding predication instruction.

Figure 4:
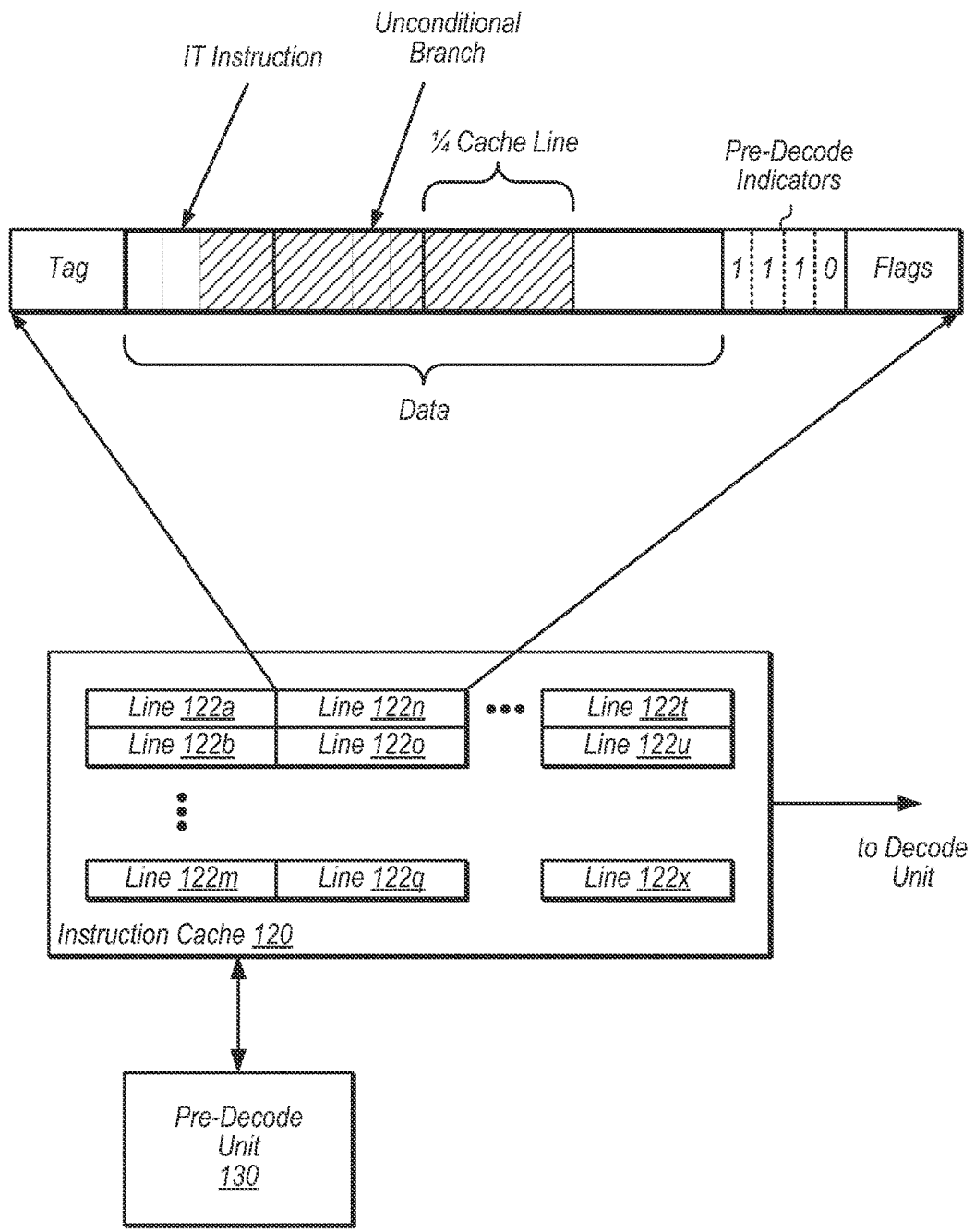
FIG. 4 illustrates a block diagram of one embodiment of an instruction cache.

Turning now to FIG. 4, a block diagram of one embodiment of an instruction cache is shown. Instruction cache 120 includes cache lines 122a-122x, each of which may include a number of bytes of instruction data. The size of a cache line may correspond to the minimum amount of data per transfer from another cache (e.g., an L2 cache) or a memory to instruction cache 120. An instruction fetch unit (not shown) or some other processing element may send a fetch request with a fetch address to instruction cache 120. If instruction cache 120 contains instruction data corresponding to the fetch address, instruction cache 120 may fetch the instruction data and provide it to another processing element such as a decode unit, for example. If instruction cache 120 does not contain instruction data corresponding to a fetch request address, the processor may be configured to load the instruction data from a cache or memory into instruction cache 120. As used herein, the terms "processing element" and/or "processing unit" may refer to various elements or combinations of elements. Processing elements include, for example, portions or circuits of individual processor cores, entire processor cores, and individual processors.

In this embodiment, instruction cache 120 is illustrated as an associative cache and may include a number of cache ways as shown in FIG. 4. In various embodiments, instruction cache 120 may be a 2-way cache, an 8-way cache, or any other appropriate number. Each way may include a number of cache lines (e.g., a first way in FIG. 4 includes at least cache lines 122a, 122b, and 122m). Alternatively, instruction cache 120 may be a direct mapped cache.

In one embodiment, each cache line may include 64 bytes of instruction data, a tag, pre-decode data, and flag data. The flag data may indicate whether a cache line is loaded with valid data. The tag may include part of the address of the instruction data in the cache line. The pre-decode data may include indications of detected IT instructions, the shadow of an IT instruction, and/or detected unconditional branches. Pre-decode unit 130 is coupled to instruction cache 120, and pre-decode unit 130 may be configured to analyze the instruction data of instruction cache 120 and generate the pre-decode data. Pre-decode unit 130 may detect an IT instruction and then mark the subsequent portions of the cache line as the shadow of the detected IT instruction. As used herein, the term "shadow" may refer to instructions that are predicted to be included within the IT instruction block. As shown in FIG. 4, the shadow is the portion of expanded cache line 122n shaded with the diagonal lines.

When pre-decode unit 130 scans the instruction data in instruction cache 120, the boundaries between the instructions stored therein may not yet be known. Therefore, in specifying the shadow of the IT instruction, pre-decode unit 130 is predicting which instructions will fall within the boundaries of the IT instruction. If an unconditional branch is detected within the shadow of the IT instruction, then pre-decode unit 130 may flag this unconditional branch as being conditional on the IT instruction.

In one embodiment, the instruction data in a cache line may be logically partitioned into four quarter cache lines for purposes of the pre-decode data. As shown in FIG. 4, there may be a bit in the pre-decode data for each quarter of a cache line. If an IT instruction is detected in one of the quarter cache lines, then the corresponding pre-decode bit may be set to one. Also, the pre-decode bits corresponding to the next two quarters of the cache line following the IT instruction may also be set to one to indicate the shadow of the IT instruction. As shown in FIG. 4, an IT instruction is detected in the first quarter of expanded cache line 122n. Therefore, the first pre-decode bit is set to one to indicate the detected IT instruction. Also, the next two pre-decode bits (corresponding to the next two quarter cache lines) are also set to one to designate the location of the shadow of the IT instruction of expanded cache line 122n.

In other embodiments, cache lines may be logically partitioned into other numbers of portions (e.g., two, eight) and the number of pre-decode indicators may match the number of portions. Also, the length of the shadow in terms of number of portions of a cache line may vary depending on the embodiment. It is also noted that the pre-decode indicators may include additional information not shown in FIG. 4. For example, a pre-decode indicator may be generated to indicate that an unconditional branch has been detected within the shadow of an IT instruction. Also, pre-decode indicators may be generated which provide a hint as to the number of uops per instruction. Other pre-decode indicators may also be generated, depending on the embodiment.

In the illustrated embodiment, instruction cache 120 is also coupled to a decode unit (not shown). In this embodiment, instruction cache 120 may be configured to provide instruction data and pre-decode indicators to the decode unit in response to a given instruction fetch request. The instruction data and pre-decode indicators for a given fetch request may be provided from a single cache line or from multiple cache lines.

Referring now to FIG. 5, one embodiment of a sample program code sequence is shown. It is noted that program code 140 is shown for illustrative purposes and is merely one example of a portion of a sample program. Code 140 is based on the ARM Thumb-2 architecture, although other architectures may be used in other embodiments.

Code 140 may begin with the instruction "ITETE EQ", which is an IT instruction with the condition of "EQ" (i.e., zero flag==1) to determine which of the following instructions are executed. The first instruction following the IT instruction (LDR r0, [r1]) will be executed if the zero flag is equal to one. The string "ETE" indicates that the subsequent instructions will be executed if the condition is false, true, and false, respectively. The fourth instruction in the IT block is a branch to label L1, and this is an unconditional branch. However, since this unconditional branch falls within an IT instruction block, this unconditional branch effectively becomes a conditional branch based on the condition of the IT instruction.

The sample code 140 may be pre-decoded in an instruction cache, similar to the example shown in FIG. 4. The IT instruction may be detected, and then the shadow of the IT instruction may be indicated using pre-decode bits. When program code 140 is fetched into a corresponding instruction cache, the unconditional branch "B L1" will be detected within the shadow of the IT instruction. Therefore, this unconditional branch may be flagged as being within an IT instruction block when the instructions are fetched out of the instruction cache. This will cause a branch prediction to be generated and utilized for this unconditional branch.

Figure 6:
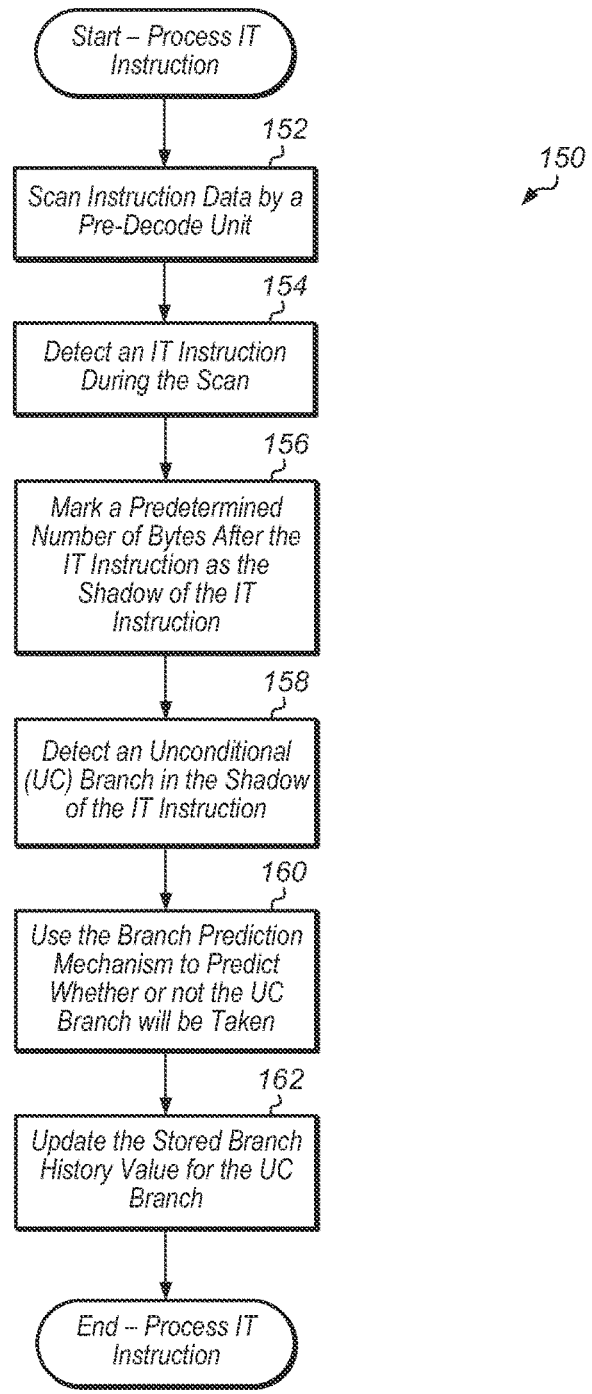
FIG. 6 is a generalized flow diagram illustrating one embodiment of a method for processing an IT instruction.

Referring now to FIG. 6, one embodiment of a method 150 for processing an IT instruction is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. Furthermore, elements of the flowchart may be performed in parallel to allow multiple load operations to be dispatched simultaneously.

Instruction data may be scanned by a pre-decode unit prior to the instruction data being fetched out of the instruction cache (block 152). In one embodiment, the instruction data may be scanned by the pre-decode unit after the instruction data has been stored in the instruction cache. In another embodiment, the instruction data may be scanned as the data is being fetched into the instruction cache from a lower-level cache or memory. In various embodiments, the instruction cache may be coupled to the lower-level cache or memory via a core interface unit or other unit. The instruction data may be searched for predication instructions (e.g., IT instructions), branch instructions, and/or other types of instructions.

An IT instruction may be detected by the pre-decode unit during the scan of the instruction data (block 154). When the IT instruction is detected, the boundaries of the IT instruction may not yet be known. Therefore, a predetermined number of bytes after the IT instruction may be marked as the shadow of the IT instruction (block 156). The shadow is intended to indicate the likely boundaries of the IT instruction block. In one embodiment, the shadow may be defined by pre-decode bits in a pre-decode array, with each pre-decode bit representing a portion of a cache line. The size of the predetermined number of bytes may vary depending on the embodiment.

Next, an unconditional branch may be detected within the shadow of the IT instruction (block 158). At this point in the processor pipeline, it may be presumed that the unconditional branch is part of the IT instruction block since the unconditional branch falls within a cache line location marked as the shadow. Then, a prediction may be generated by a branch direction prediction mechanism as to whether or not the unconditional branch will be taken (block 160). The prediction may be based at least upon a stored history value calculated from previous executions of the unconditional branch. In one embodiment, if this is the first time the unconditional branch has been encountered, and there is not any stored history information for the unconditional branch, then a not taken predication may be made. Once the status of the unconditional branch has been resolved, the stored branch history value for the unconditional branch may be updated to reflect whether the prediction was correct or incorrect (block 162). For example, if the prediction for the unconditional branch is found to be incorrect, the branch direction prediction mechanism may be trained on this mispredict. After block 162, method 150 may end.

Figure 7:
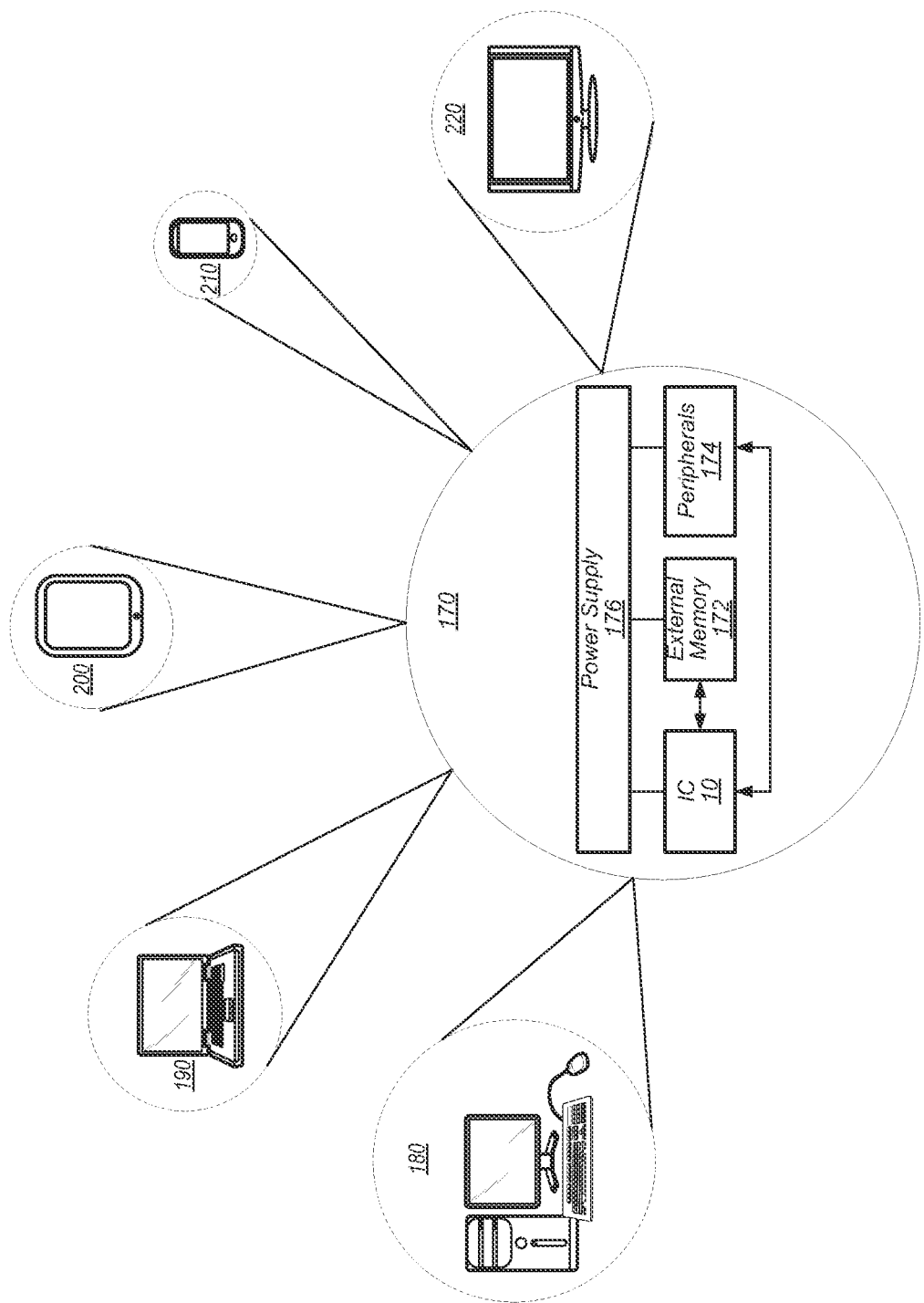
FIG. 7 is a block diagram of one embodiment of a system.

Referring next to FIG. 7, a block diagram of one embodiment of a system 170 is shown. As shown, system 170 may represent chip, circuitry, components, etc., of a desktop computer 180, laptop computer 190, tablet computer 200, cell phone 210, television 220 (or set top box configured to be coupled to a television), or otherwise. In the illustrated embodiment, the system 170 includes at least one instance of IC 10 (of FIG. 1) coupled to an external memory 172.

IC 10 is coupled to one or more peripherals 174 and the external memory 172. A power supply 176 is also provided which supplies the supply voltages to IC 10 as well as one or more supply voltages to the memory 172 and/or the peripherals 174. In various embodiments, power supply 176 may represent a battery (e.g., a rechargeable battery in a smart phone, laptop or tablet computer). In some embodiments, more than one instance of IC 10 may be included (and more than one external memory 172 may be included as well).

The memory 172 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 174 may include any desired circuitry, depending on the type of system 170. For example, in one embodiment, peripherals 174 may include devices for various types of wireless communication, such as wifi, Bluetooth, cellular, global positioning system, etc. The peripherals 174 may also include additional storage, including RAM storage, solid state storage, or disk storage. The peripherals 174 may include user interface devices such as a display screen, including touch display screens or multi-touch display screens, keyboard or other input devices, microphones, speakers, etc.

Figure 8:
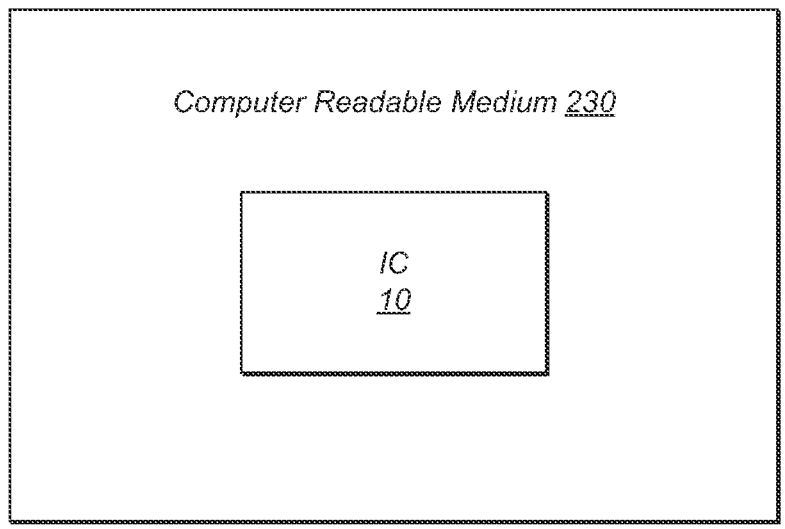
FIG. 8 is a block diagram of one embodiment of a computer readable medium.

Turning now to FIG. 8, one embodiment of a block diagram of a computer readable medium 230 including one or more data structures representative of the circuitry included in IC 10 (of FIG. 1) is shown. Generally speaking, computer readable medium 230 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 230 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 230 may be the netlist(s) (with or without the synthesis library) or the data set(s), as desired. In yet another alternative, the data structures may comprise the output of a schematic program, or netlist(s) or data set(s) derived therefrom.

While computer readable medium 230 includes a representation of IC 10, other embodiments may include a representation of any portion or combination of portions of IC 10 (e.g., fetch unit, pre-decode unit).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   an instruction cache configured to store instruction data and corresponding pre-decode data;
   a pre-decode unit configured to:
      scan instruction data stored in the instruction cache;
      detect a predication instruction during said scan, wherein a predication instruction is executable to predicate a variable number of instructions; and
      in response to detecting the predication instruction, generate pre-decode data to mark a given number of bytes of instruction data following the predication instruction prior to identifying boundaries between instructions within the given number of bytes of instruction data;
   a decode unit coupled to the instruction cache to receive a plurality of instructions and the corresponding pre-decode data from the instruction cache; and
   a branch direction predictor coupled to the decode unit and configured to predict conditional branches;
   wherein in response to detecting that the pre-decode data indicates that an unconditional branch instruction is located within the marked given number of bytes, the decode unit is configured to associate a conditional branch prediction from the branch direction predictor with the unconditional branch instruction prior to determining a number of instructions to predicate based on the detected predication instruction.

2. The apparatus as recited in claim 1, wherein the pre-decode data includes a plurality of indicators for each cache line stored in the instruction cache, wherein the pre-decode data includes an indication of a shadow of the predication instruction, wherein the shadow of the predication instruction identifies instruction data that is predicted to correspond to instructions the predicate instruction is executable to predicate.

3. The apparatus as recited in claim 1, wherein to mark the given number of bytes, the pre-decode unit is configured to:
   set a pre-decode bit for a given portion of a cache line including the predicate instruction; and
   set pre-decode bits for two portions of the cache line following the given portion.

4. The apparatus as recited in claim 1, wherein:
   the instruction cache stores instruction data as cache lines;
   the apparatus is configured to logically partition each cache line in the instruction cache into a plurality of equal sized portions; and
   the pre-decode data includes a single indicator for each portion.

5. The apparatus as recited in claim 4, wherein each said indicator is a single bit.

6. The apparatus as recited in claim 3, wherein the instruction cache is configured to store instructions of varying sizes.

7. The apparatus as recited in claim 1, wherein the predication instruction is an if-then (IT) instruction.

8. A method comprising:
   storing instruction data and corresponding pre-decode data in an instruction cache;
   scanning cache lines in an instruction cache to detect any predication instructions;
   detecting a predication instruction during said scan, wherein a predication instruction is executable to predicate a variable number of instructions;
   in response to detecting the predication instruction, generating pre-decode data to mark a given number of bytes of instruction data following the predication instruction prior to identifying boundaries between instructions within the given number of bytes of instruction data;
   generating a pre-decode indicator for each portion of each cache line to indicate if the portion follows the predication instruction within a predetermined distance; and
   generating a branch direction prediction for an unconditional branch instruction prior to determining a number of instructions to predicate based on the detected predication instruction, wherein the number of instructions are located within boundaries of the predication instruction, and wherein said generating is responsive to determining that the pre-decode data includes an indication that the unconditional branch instruction is located within the marked given number of bytes.

9. The method as recited in claim 8, wherein the pre-decode data includes an indication of a shadow of the predication instruction, wherein the shadow of the predication instruction identifies instruction data that is predicted to correspond to instructions the predicate instruction is executable to predicate.

10. The method as recited in claim 8, wherein to mark the given number of bytes, the method comprises:
    setting a pre-decode bit for a given portion of a cache line including the predicate instruction; and
    setting pre-decode bits for two portions of the cache line following the given portion.

11. The method as recited in claim 8, further comprising:
    storing instruction data as cache lines in the instruction cache; and
    logically partitioning each cache line in the instruction cache into a plurality of equal sized portions, wherein the pre-decode data includes a single indicator for each portion.

12. The method as recited in claim 11, wherein cache lines are loaded into the instruction cache from a lower-level cache, and wherein the lower-level cache is a level two (L2) cache.

13. The method as recited in claim 8, wherein the predication instruction includes a condition, the method further comprising predicting a result of the condition with a branch direction predictor to generate the branch direction prediction.

14. The method as recited in claim 8, further comprising sending the unconditional branch instruction to a decode unit from the instruction cache.

15. A method comprising:
    storing instruction data and corresponding pre-decode data in an instruction cache;
    scanning cache lines in an instruction cache to detect any predication instructions;
    detecting a predication instruction during said scanning, wherein a predication instruction is executable to predicate a variable number of instructions;
    in response to detecting the predication instruction, generating pre-decode data to mark a given number of bytes of instruction data following the predication instruction prior to identifying boundaries between instructions within the given number of bytes of instruction data;
    detecting an unconditional branch instruction within the marked given number of bytes in the instruction cache prior to determining a number of instructions to predicate based on the detected predication instruction, wherein the number of instructions are located within boundaries of the predication instruction; and
    generating a conditional branch prediction for the unconditional branch instruction.

16. The method as recited in claim 15, wherein the pre-decode data includes a plurality of indicators for each cache line stored in the instruction cache, wherein the pre-decode data includes an indication of a shadow of the predication instruction, wherein the shadow of the predication instruction identifies instruction data that is predicted to correspond to instructions the predicate instruction is executable to predicate.

17. The method as recited in claim 15, further comprising:
    setting a pre-decode bit for a given portion of a cache line including the predicate instruction and setting pre-decode bits for two portions of the cache line following the given portion.

18. The method as recited in claim 15, further comprising:
    storing instruction data as cache lines in the instruction cache; and
    logically partitioning each cache line in the instruction cache into a plurality of equal sized portions, wherein the pre-decode data includes a single indicator for each portion.

19. The method as recited in claim 15, wherein the marked given number of bytes is based on a maximum possible number of dependent instructions of the predication instruction.

20. The method as recited in claim 15, further comprising utilizing a pre-decode unit to detect the predication instruction in the instruction cache.

* * * * *